United States Patent
Nakamura (10) Patent No.: US 7,810,879 B2
(45) Date of Patent: Oct. 12, 2010

(54) VEHICLE SUN ROOF SYSTEM

(75) Inventor: Teruyuki Nakamura, Tokyo (JP)

(73) Assignee: Yachiyo Industry Co., Ltd., Saitama (JP)

( * ) Notice: Subject to any disclaimer, the term of this patent is extended or adjusted under 35 U.S.C. 154(b) by 2 days.

(21) Appl. No.: 12/283,506

(22) Filed: Sep. 12, 2008

(65) Prior Publication Data

US 2009/0072588 A1  Mar. 19, 2009

(30) Foreign Application Priority Data

Sep. 19, 2007 (JP) ............................. 2007-241764
May 28, 2008 (JP) ............................. 2008-139783
Aug. 5, 2008 (JP) ............................. 2008-201935

(51) Int. Cl.
*B60J 7/05* (2006.01)
(52) U.S. Cl. ..................................................... 296/221
(58) Field of Classification Search ................. 296/221, 296/224
See application file for complete search history.

(56) References Cited

U.S. PATENT DOCUMENTS

| 4,332,416 A * | 6/1982 | Lutz et al. ..................... 296/213 |
| 4,647,104 A * | 3/1987 | Kohlpaintner et al. ....... 296/221 |
| 5,085,622 A | 2/1992 | Kohlpaintner et al. |
| 5,718,472 A | 2/1998 | Otake et al. |
| 6,290,289 B1 * | 9/2001 | Ohtsu et al. .................. 296/221 |
| 6,390,545 B1 * | 5/2002 | Makino et al. ............... 296/223 |
| 6,467,838 B2 * | 10/2002 | Hirata ........................ 296/221 |

FOREIGN PATENT DOCUMENTS

| JP | 2-246825 | 10/1990 |
| JP | 2001-146114 | 5/2001 |
| JP | 2003-326976 A | 11/2003 |

* cited by examiner

*Primary Examiner*—Dennis H Pedder
(74) *Attorney, Agent, or Firm*—Carrier Blackman & Associates P.C.; Joseph P. Carrier; William D. Blackman

(57) ABSTRACT

In a sun roof system, a panel bracket (13) attached to a sun roof panel (11) is provided with a guide slot (14) having a prescribed profile and extending in a fore-and-aft direction, and is slidably supported on a guide rail (21) by a front slider (15) and a rear slider (16). The rear slider is provided with a pin (17c) engaged by the guide slot. The panel bracket is also provided with a front cam piece (41) and a rear cam piece (42) slidably supported by the guide rail. The guide rail is provided with a horizontal main cam groove (21b, 21d), a front cam groove (43) for smoothly guiding the front cam piece into and out of the main cam groove and a rear cam groove for smoothly guiding the rear cam piece into and out of the main cam groove. The cooperation between the front and rear cam pieces and the front and rear cam grooves, respectively, is effective in preventing the undesired fore-and-aft movement of the sub roof panel not only when the sun roof is fully closed but also when tiling up and tiling down the sun roof panel.

5 Claims, 10 Drawing Sheets

VEHICLE SUN ROOF SYSTEM

TECHNICAL FIELD

The present invention relates to a vehicle sun roof system, and in particular to a vehicle sun roof system that can both slide and tilt up a sun roof panel.

BACKGROUND OF THE INVENTION

In a conventionally known vehicle sun roof system, an opening of a vehicle roof is normally closed by a sun roof panel, and can be opened either by tilting up the rear end of the sun roof panel or by tilting down the sun roof panel and sliding the sun roof panel rearward. See U.S. Pat. No. 5,718,472.

The sun roof panel is typically fitted with a pair of brackets on a lower surface thereof along either lateral edge thereof, and each bracket is supported by a pair of sliders disposed one behind the other which are in turn slidably supported, respectively, by a guide rail extending along the corresponding side of the opening. The sliders are moved along the guide rails by being pushed and pulled by a cogged cable, and are each incorporated with a mechanism for lifting and lowering the sun roof panel as required.

More specifically, when the sun roof panel is at its fully closed position, and the cable is actuated in the forward direction, the link mechanism causes the rear end of the sun roof panel to be raised (tilt up position). Conversely, when the sun roof panel is at its tilted up position, and the cable is actuated in the rearward direction, the sun roof panel tilts down to the original fully closed position. When the cable is actuated further in the rearward direction, the sun roof panel is lowered to a position (tilt down position) clear from the roof panel owing to the action of the mechanism and is then slid rearward to a slide open position. When the cable is actuated forward from this position, the sun roof panel is slid forward to the original fully closed position reversing the slide opening process.

In this previously proposed sun roof system, to prevent the fore-and-aft movement of the sun roof panel at its fully closed position, the front slider fixedly attached to the sun roof panel is engaged by the guide groove of the guide rail while a pin carried by the rear slider is engaged by a substantially horizontal section of a guide slot formed in the panel bracket fixedly secured to the sun roof panel. In the tilted up position, a rectangular block formed in a support lever (link) pivotally connected to a middle part of the panel bracket is engaged by a cutout formed in the guide rail, and this prevents the fore-and-aft movement of the sun roof panel at the fully closed position thereof.

Japanese patent laid open publication No. 2001-146114 discloses a sun roof panel system that is aimed to simplify the structure for preventing the undesired fore-and-aft movement of the sun roof panel. A cam piece fixedly secured to a front part of each panel bracket is received by a vertical groove formed in a front end of the guide rail to prevent the fore-and-aft movement of the sun roof panel when the sun roof panel is at any angle between the fully closed position and fully tilted up position. When the sun roof panel is tilted down from the fully closed position, the cam piece is disengaged from the vertical groove, and is allowed to be guided along a horizontal groove formed in the guide rail.

According to this proposal, because there are only a pair of cam pieces that restrict the fore-and-aft movement of the sun roof panel, the cam piece is required to be strong enough to withstand the force acting upon the sun roof panel, and this requires an increase in the size of the cam piece and associated guide groove. Also, this restricting arrangement is effective only when the sun roof panel is between the fully closed position and fully tilted up position so that the sun roof panel is relatively unrestricted as it is tilted down from the fully closed position. The sun roof may move in the fore-and-aft direction as it is tilted down from its fully closed position, and this could not only cause undesired rattling and noises but also apply undue forces to various parts of the mechanism. In this prior sun roof system, a similar cam piece is formed on a rear part of each panel bracket, and the guide rail is formed with a notch for passing the rear cam piece into the horizontal guide groove as the sun roof panel is tilted down prior to moving rearward. Therefore, as the sun roof panel is moved rearward, the front cam piece passes this notch, and this notch may prevent the smooth movement of the front cam when the sun roof panel is subjected to vertical accelerations as is often the case when the vehicle is traveling over an irregular road surface.

BRIEF SUMMARY OF THE INVENTION

In view of such problems of the prior art, a primary object of the present invention is to provide a sun roof system in which a sun roof panel is prevented from an undesired fore-and-aft movement over a wide range of operation.

A second object of the present invention is to provide a sun roof system which is free from rattling and noises over a wide range of operation.

A third object of the present invention is to provide a sun roof system which is reliable in operation and simple in structure.

According to the present invention, such objects are at least partly accomplished by providing a sun roof system for selectively opening an opening of a vehicle roof with a sun roof panel, comprising: a pair of guide rails extending along either lateral side of the opening of the vehicle roof; a pair of panel brackets integrally attached to either lateral side of the sun roof panel, each panel bracket including a front cam piece provided at a front part thereof, a rear cam piece provided at some distance behind the front cam piece and a guide slot extending a prescribed distance in a fore-and-aft direction and given with a prescribed profile; a front slider provided at a front end of each panel bracket for slidably supporting a front end of the panel bracket on the corresponding guide rail; a rear slider provided slidably supported by each guide rail behind the corresponding front slider, the rear slider being provided with a pin that engages the guide slot; and an actuator for actuating each rear slider in the fore-and-aft direction; the profile of the guide slot being configured such that a forward movement of the pin along the guide slot from a neutral point causes a vertical upward tilting of the sun roof panel around the front slider, a rearward movement along the guide slot from the neutral point causes a vertical downward tilting of the sun roof panel around the front slider as the pin travels, and a further rearward movement of the pin along the guide slot causes a rearward sliding movement of the sun roof panel; wherein the guide rail is provided with at least one main cam groove for guiding the front cam piece and rear cam piece in the fore-and-aft direction, a front vertical cam groove for vertically guiding the front cam piece into and out of the main cam groove and a rear vertical cam groove for vertically guiding the rear cam piece into and out of the main cam groove.

Because the front and rear cam pieces are both guided by the front and rear cam grooves, respectively, the sun roof panel can be restricted from the fore-and-aft movement over a wider range of the movement of the sun roof panel, and the rattling of the sun roof panel and generation of noises can be effectively prevented.

According to a preferred embodiment of the present invention, the sun roof panel is at a first angle (d1) with respect to the guide rail when the sun roof panel is at a fully closed position, at a second angle (d2) when the sun roof panel is at a fully tilted up position, and at a third angle (d3) when the sun roof panel is fully tilted down for the rearward sliding movement, and the front cam piece is engaged against a rearward movement by the front cam groove at least over a first angular range (D1) extending from the second angle to a fourth angle (d4) slightly greater than the third angle, the rear cam piece being engaged by the rear cam groove against a fore-and-aft movement over a second angular range extending from a fifth angle (d5) greater than the fourth angle to a sixth angle (d6) slightly greater than the third angle.

Thus, the front cam piece engages the sun roof panel against the fore-and-aft movement when the sun roof panel is at least between the fully closed position and fully tilted up position (first angular range D1). This angular range (D1) extends to the fourth angle (d4) which is slightly greater than the third angle (d3) but is also smaller than the first angle (d1). Meanwhile, the rear cam piece is engaged by the rear cam groove against the fore-and-aft movement over the second angular range (D2) extending from the fifth angle (d5) greater than the fourth angle to the sixth angle (d6) slightly greater than the third angle. Therefore, the sun roof panel is engaged against the fore-and-aft movement both by the first cam piece and second cam piece over the angular range extending from the fifth angle (d5) to the fourth angle (d4) or the angular range where the first and second angular ranges (D1 and D2) overlap with each other. Therefore, the sun roof panel is engaged against the fore-and-aft movement by both the front cam piece and second cam piece at least in part of the time when the sun roof panel is being tilted down from the fully closed position to the fully tilted down position for the rearward sliding movement. The fifth angle (d5) may be smaller than the first angle, but may also be greater than the first angle if desired.

According to a certain aspect of the present invention, the rear cam groove comprises an upper vertical section and a lower slanted section that smoothly connects the upper vertical section to the main cam groove. Thereby, the rear cam piece can be engaged effectively against the fore-and-aft movement and smoothly guided into and out of the main cam groove which is connected to the lower end of the slanted section. The lower slanted section may also be effective in engaging the rear cam piece against the fore-and-aft movement if the guide slot restricts the vertical movement of the panel bracket.

According to another aspect of the present invention, the front cam groove is defined by a front wall and a rear wall, and at least one of the front wall and rear wall engages the front cam piece with a vertically extending surface when the sun roof panel is at the first angle with respect to the guide rail. Preferably, the front cam groove comprises a vertical middle section, a rearwardly slanted upper section that causes a slight rearward movement to the sun roof panel when tilting up the sun roof panel and a rearwardly slanted lower section that smoothly connects the vertical middle section to the main cam groove.

The vertical front section is highly effective in preventing the fore-and-aft movement of the sun roof panel because the cam piece is engaged by a plane perpendicular to the direction of motion.

According to a particularly preferred embodiment of the present invention, the main cam groove comprises an upper cam groove for guiding the rear cam piece and a lower cam groove for guiding the front cam piece that are separated from each other by a horizontal wall.

Thereby, the upper wall of the lower cam groove may be made entirely continuous over the entire length thereof, and the front cam piece is allowed to move freely over the entire stroke of its movement without the possibility of being caught by a notch or cutout required for introducing the rear cam piece into the main cam groove or the corresponding part of the cam groove.

According to a highly compact embodiment of the present invention, the guide rail comprises a pair of upright walls extending in the fore-and-aft direction, and the upper cam groove and lower cam groove are formed on a side of one of the upright walls facing the other, a side of the other upright wall facing the one upright wall being provided with a slider guide groove for guiding the front slider and rear slider.

The rear slider may be further provided with a cable slider that engages a cable for actuating the rear slider, and the cable slider is guided by a part of at least one of the upper and lower cam grooves so that the rear slider may be guided in a smooth and reliable manner, and the number of necessary component parts may be minimized.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
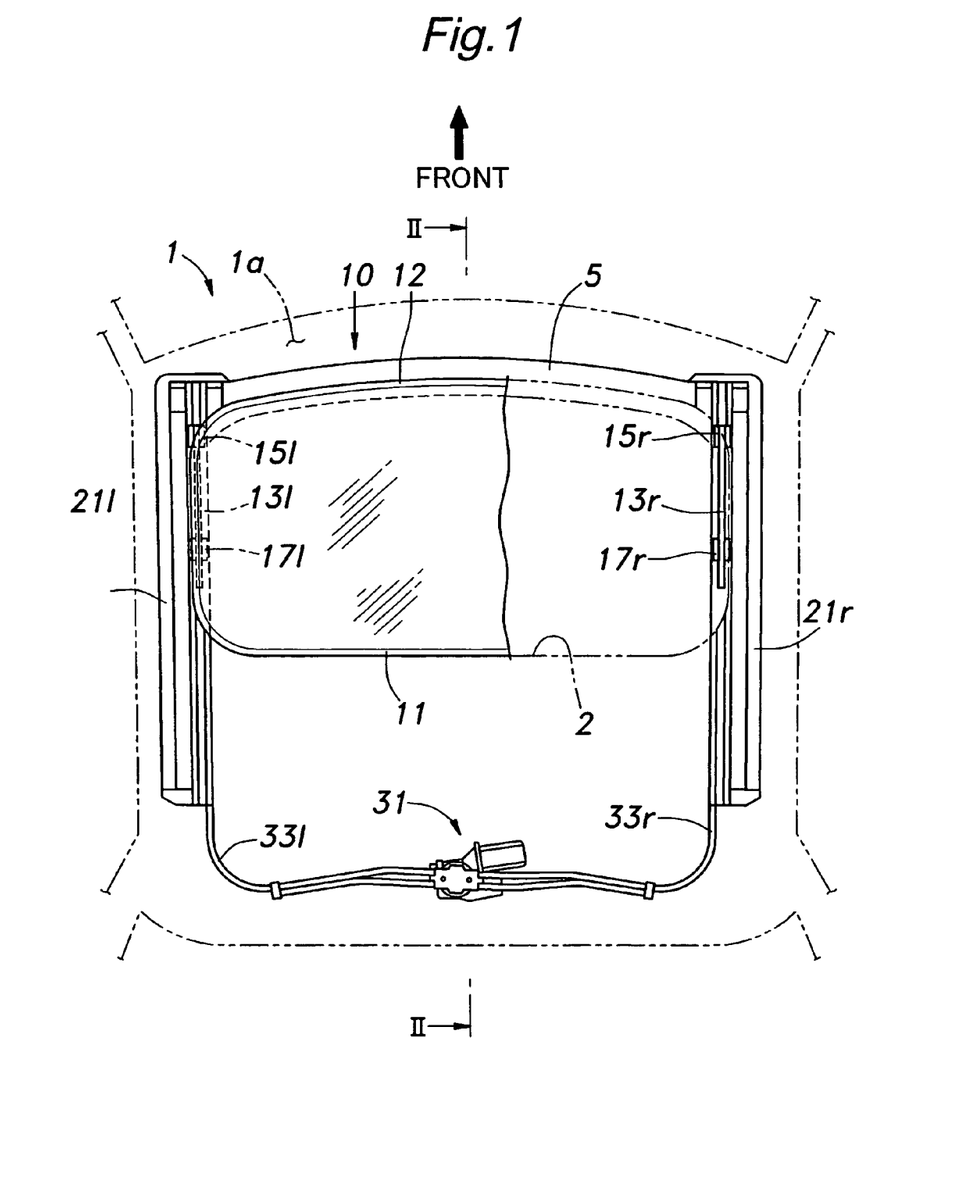
FIG. 1 is a simplified plan view of an automotive sun roof system embodying the present invention.
Figure 2:
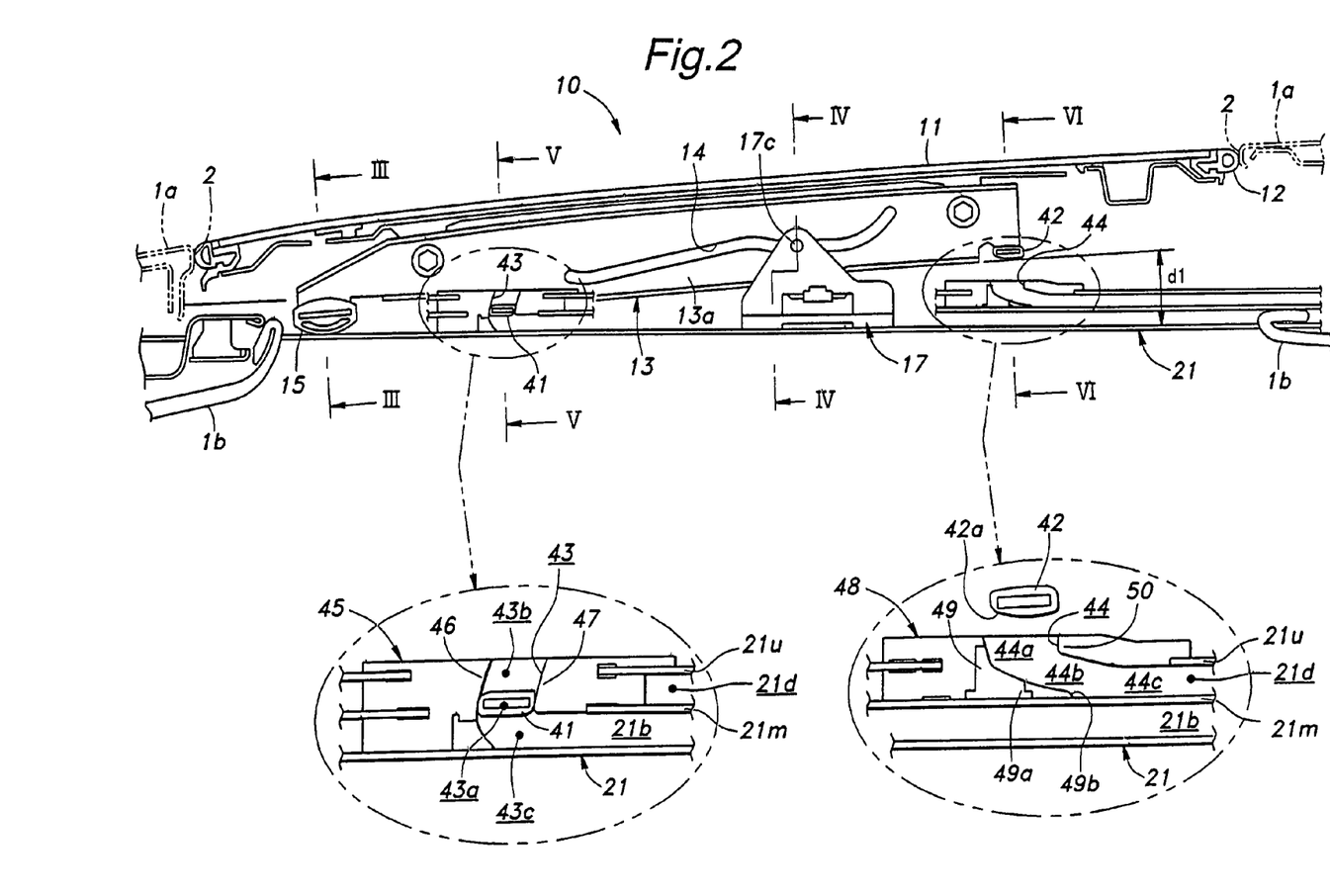
FIG. 2 is a sectional view taken along line II-II of FIG. 1 in the fully closed condition.

FIG. 1 is a simplified plan view of an automotive sun roof system embodying the present invention, and FIG. 2 is a sectional view taken along line II-II of FIG. 1 in the fully closed condition. In these and other drawings, some of the parts are omitted from illustration for the purpose of avoiding the crowding of the drawings. The sun roof system is generally symmetric about the central longitudinal line extending in the fore-and-aft direction, and the similar parts on the right hand side and left hand side are denoted with same numerals followed by suffixes "r" and "l" to indicate the parts are on the right hand side and left hand side, respectively. Only the parts on one side of the entire system are discussed in most of the following discussion because the two sides are substantially identical in structure.

Referring to FIGS. 1 and 2, a rectangular opening 2 is formed in a front part of a roof 1 of a vehicle body. The roof 1 includes a roof panel 1*a* defining an exterior or an upper surface of the roof 1, an interior panel 1b attached to the lower surface of the roof panel 1a in a spaced apart relationship and a sun roof system 10 for selectively closing the opening 2 in the roof 1. The sun roof panel system 10 comprises a sun roof panel 11 which normally closes the opening 2 but may be slid rearward (opened) and tilted upward (tilted up) as desired, a pair of panel brackets 13l and 13r attached to the lower side of the sun roof panel 11 and extending along either side edge of the sun roof panel 11, a pair of guide rails 21l and 21r attached to the upper surface of the interior panel 1b and extending along either side of the opening 2 and a reversible drive motor 31 attached to the upper surface of the interior panel 1b adjacent to the rear edge of the opening 2.

The sun roof panel 11 is typically made of a sheet of glass, and is provided with a weather strip 12 made of elastomeric material and extending along the entire periphery of the sun roof panel 11. The sun roof panel 11 is disposed such that the upper surface thereof is flush with the upper surface of the roof panel 1a in the fully closed position. In the tilted up position, the rear end of the sun roof panel 11 is raised. In the open position, the sun roof panel 11 is lowered at the rear end thereof, and is slid rearward to be received in a space defined between the roof panel 1a and interior panel 1b.

The sun roof panel 11 is actuated for the required vertical movement by a cam mechanism which is described hereinafter. A front end of each panel bracket 13 is provided with a front slider 15 that is guided by the corresponding guide rail 21. A rear slider 17 is guided by the guide rail 21 behind the front slider 15 at some distance therefrom, and is provided with a lateral pin 17c which is received in a guide slot 14 formed in the corresponding panel bracket 13 in an upper part thereof. The rear slider 17 is connected to a cogged push-pull cable 33 which is actuated by the drive motor 31 so that the rear slider 17 may be actuated in the fore-and-aft direction by driving the drive motor 31 in a desired direction.

Figure 3:
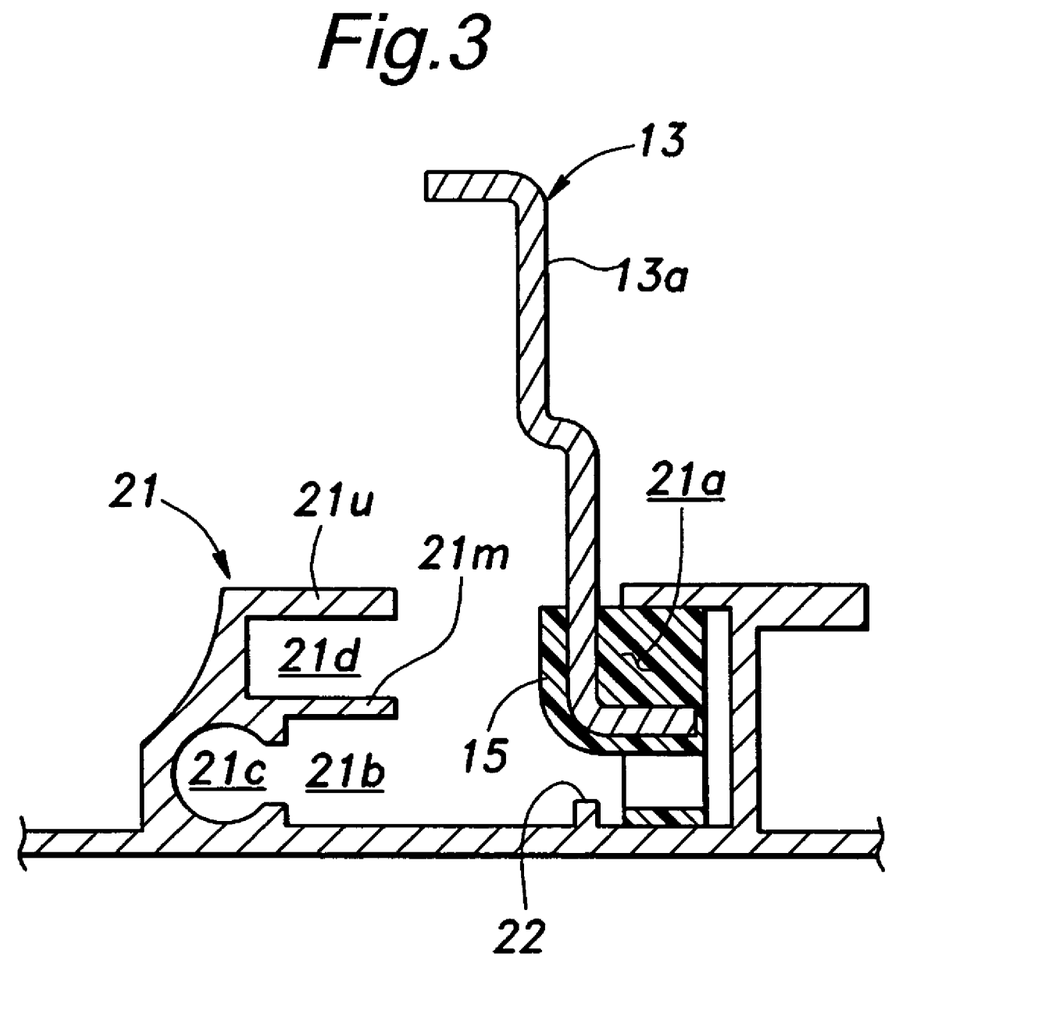
FIGS. 3 to 6 are sectional views taken along lines III-III, IV-IV, V-V and VI-VI of FIG. 2, respectively.
Figure 4:
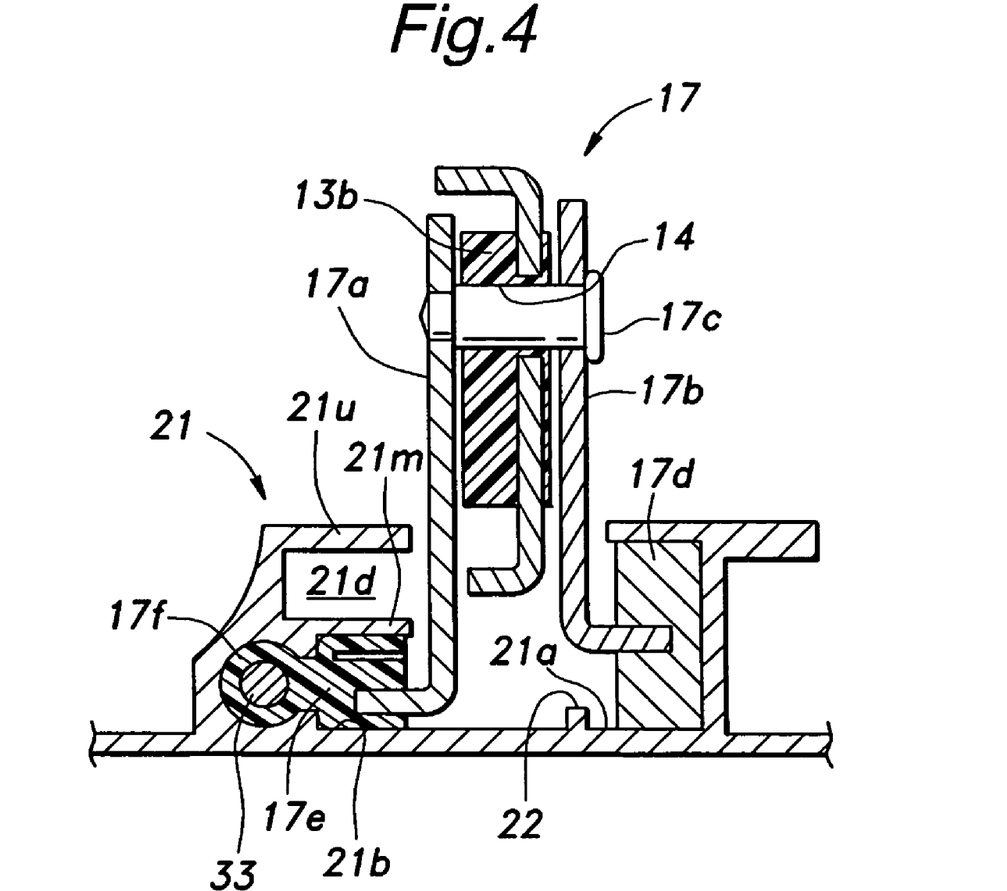

FIGS. 3 and 4 are sectional views taken along lines III-III and IV-IV of FIG. 1, respectively. As shown in FIGS. 2 to 4, each guide rail 21 is provided with a pair of upright walls. The outboard upright wall defines an outer guide groove 21a on an inboard side thereof that receives the front slider 15 and a slide shoe 17d of the rear slider 17. The inboard upright wall defines a pair of inner guide grooves 21b and 21d, one above the other, on an outboard side thereof. A cable guide groove 21c having a round cross section is formed in a bottom end (inboard end) of the lower inner guide groove 21b. Thus, the outer guide groove 21a opposes the inner guide grooves 21b and 21d.

Each panel bracket 13 includes a vertical flange 13a depending from the sun roof panel 11, and the front slider 15 is formed by outsert molding a plastic piece around an extension of the vertical flange 13a. The vertical flange 13a is formed with a guide slot 14 extending in the fore-and-aft direction and given with a prescribed vertical profile as will be described hereinafter. In the illustrated embodiment, the guide slot 14 is defined by a plastic member 13b which is made of plastic material having a favorable frictional property, and is molded around a slotted middle part of the vertical flange 13a. This plastic member 13b has a prescribed thickness so as to serve also as a spacer that controls the lateral movement of the panel bracket 13 relative to the rear slider 17. The upper and lower surfaces of the front slider 15 are curved, and a sheet spring is incorporated in a lower part of the front slider 15 so that the front slider 15 may be smoothly and resiliently guided along the outer guide groove 21a of the guide rail 21.

The rear slider 17 is provided with a pair of lifters 17a and 17b consisting of vertically extending plate members laterally spaced from each other and interposing the vertical flange 13a and the plastic member 13b between them. A guide pin 17c is passed across the two lifters 17a and 17b and through the guide slot 14. The lower ends of the lifters 17a and 17b are perpendicularly bent away from each other, and are outsert molded with a cable slider shoe 17e and a rear slider shoe 17d, respectively. The cable slider shoe 17e is integrally connected to the push-pull cable 33, and is guided in both the cable guide groove 21c and the lower inner guide groove 21b. The rear slider shoe 17d is guided in the outer guide groove 21a. The upper surface of the bottom wall of the guide rail 21 between the two vertical upright walls thereof is formed with a ridge 22 extending in the fore-and-aft direction so that the front slider 15 and the rear slider shoe 17d may not be dislodged from the outer slider guide groove 21a during operation.

Figure 5:
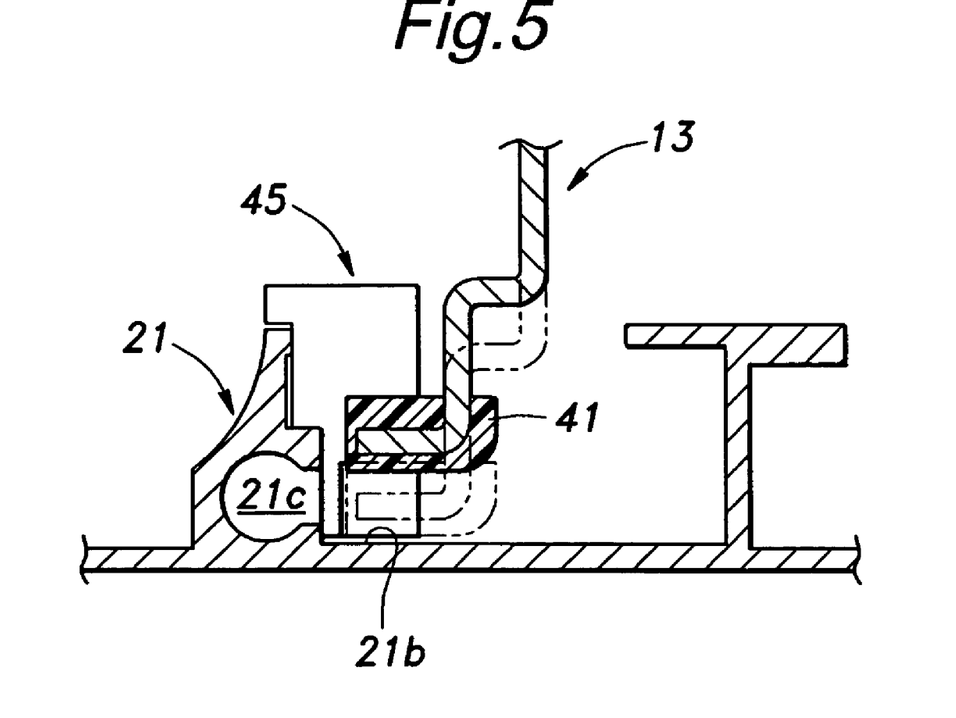

FIG. 5 is a sectional view taken along line V-V of FIG. 1. As shown in FIGS. 2 and 5, a front cam piece 41 is formed by outsert molding a plastic piece onto a lower extension of the vertical flange 13a bent in an inboard direction at some distance behind the front slider 15, and is configured to be received in the lower inner guide groove 21b for guided movement. In a front part of the guide rail 21, an upper wall 21u of the upper inner groove 21d and a lower wall 21m of the upper inner groove 21d (or an upper wall of the lower inner groove 21b) are partly removed, and a front guide member 45 made of plastic material is fitted into the front part of the inner grooves 21b and 21d of the guide rail 21. In FIG. 5, the solid lines indicate the fully closed position of the sun roof panel 11, and the double-dot chain-dot lines indicate the lowered position of the sun roof panel 11.

Figure 6:
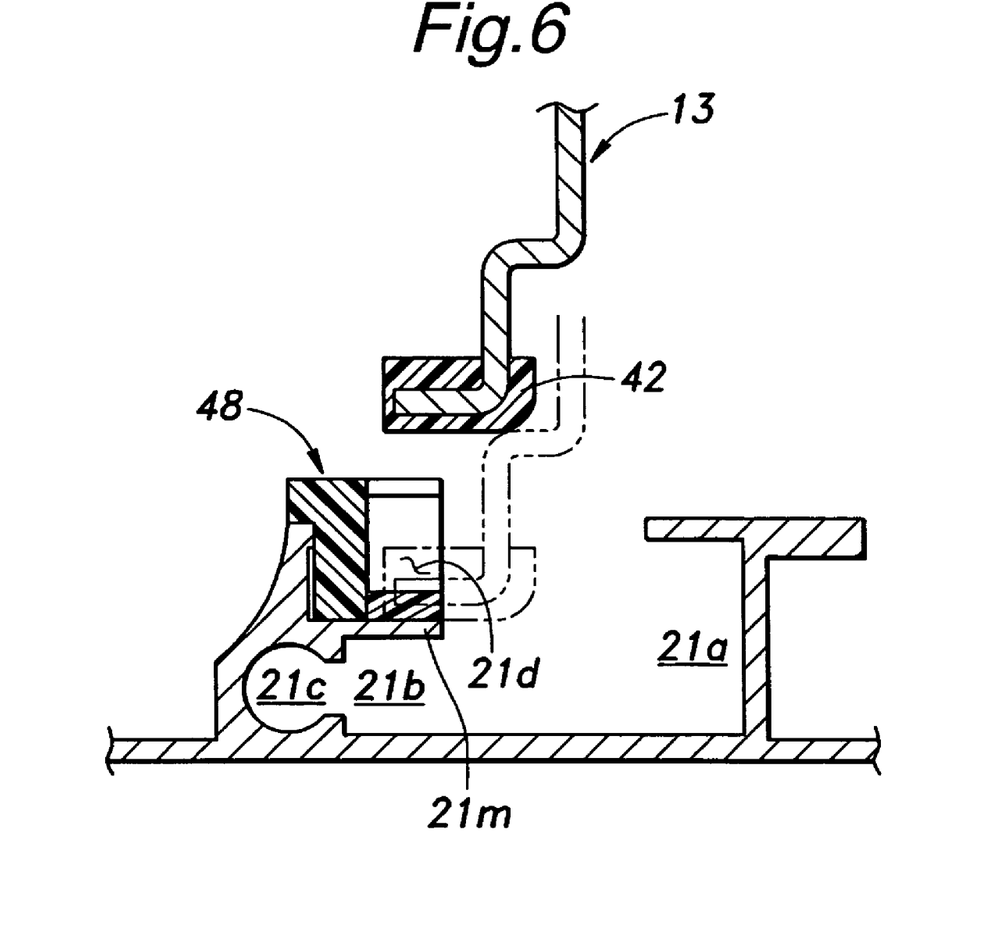

FIG. 6 is a sectional view taken along line VI-VI of FIG. 1. As shown in FIGS. 2 and 6, a rear cam piece 42 is formed by outsert molding a plastic piece onto a lower extension of the vertical flange 13a bent in an inboard direction at a rearmost end thereof, and is configured to be received in the upper inner guide groove 21d for guided movement. In the part of the guide rail 21 immediately below the rear cam piece 42 of the fully closed sun roof panel 11, the upper wall 21u of the upper inner groove 21d is partly removed, and a rear guide member 48 made of plastic material is fitted into this part of the upper inner guide groove 21d. The lower inner guide groove 21b or the part below a bottom wall 21m of the upper inner guide groove 21d is clear from any obstruction without being blocked by the rear guide member 48.

The front guide member 45 is formed with a generally vertical front cam groove 43, defined by a front wall 46 and a rear wall 47, for guiding the front cam piece 41. The front wall 46 and rear wall 47 interpose the front cam piece 41 substantially without any play so that the fore-and-aft movement of the sun roof panel 11 is restricted when the front cam piece 41 is received in this front cam groove 43. In the fully closed condition of the sun roof panel 11, the front cam piece 41 is engaged by substantially vertical sections of the front and rear walls 46 and 47 (a vertical section 43a of the front cam groove 43) located on or slightly above the lower wall 21m of the upper inner groove 21d in elevation so that the fore-and-aft movement of the sun roof panel 11 is positively restricted when the front cam piece 41 is at this position. The front cam groove 43 additionally includes an upper slanted section 43b which extends upward from the vertical section 43a with a slight rearward slant (optionally with a slight curve), and terminates at a position slightly above the upper wall 21u of the upper inner groove 21d, and a lower slanted section 43c which is defined by the front wall, and is given with a slight slant toward the rear (optionally with a slight curve), and fully communicates with the front end of the lower inner groove 21b. Thus, the front cam groove 43 is given as a smooth guide path that connects with the lower inner groove 21b.

The rear guide member 45 is formed with a generally oblique (downward slope toward the rear) rear cam groove 44, defined by a front wall 49 and a rear wall 50, for guiding the rear cam piece 42. The front wall 49 and rear wall 50 interpose the rear cam piece 42 substantially without any play so that the fore-and-aft movement of the sun roof panel 11 is restricted when the rear cam piece 42 is in this rear cam groove 44. The front wall 49 is provided with a relatively steep upper part and a less steep lower part 49a which connects with the upper surface of the lower wall 21m of the upper inner groove 21d via a chamfered step 49b. In short, the rear cam groove 44 is given as a smooth guide path that comprises a relatively vertical upper section and a rearwardly slanted lower section that smoothly connects with the lower inner groove 21d. The front and lower corner of the rear cam piece 42 is formed as a beveled (or chamfered) portion 42a so that the rear cam piece 42 is enabled to be engaged by the front wall 49 of the rear cam groove 44 without producing noises or vibrations. The rear cam groove 44 thus includes a short substantially vertical upper section 44a, a curved middle section 44b and a lower section 44c smoothly merging with the horizontal upper inner groove 21d.

When the sun roof panel 11 is at the fully closed position and the upper surface thereof is flush with the upper surface of the roof 1, the pin 17c of the rear slider 17 is located in a middle or neutral part of the guide slot 14, and the sun roof panel 11 or the panel bracket 13 forms an angle d1 with respect to the guide rail 21. The front cam piece 41 is located in the vertical section 43a and is closely interposed between the front and rear walls 46 and 47 while the rear cam piece 42 is located above the upper end of the rear cam groove 44 and is free from any restriction.

Figure 7:
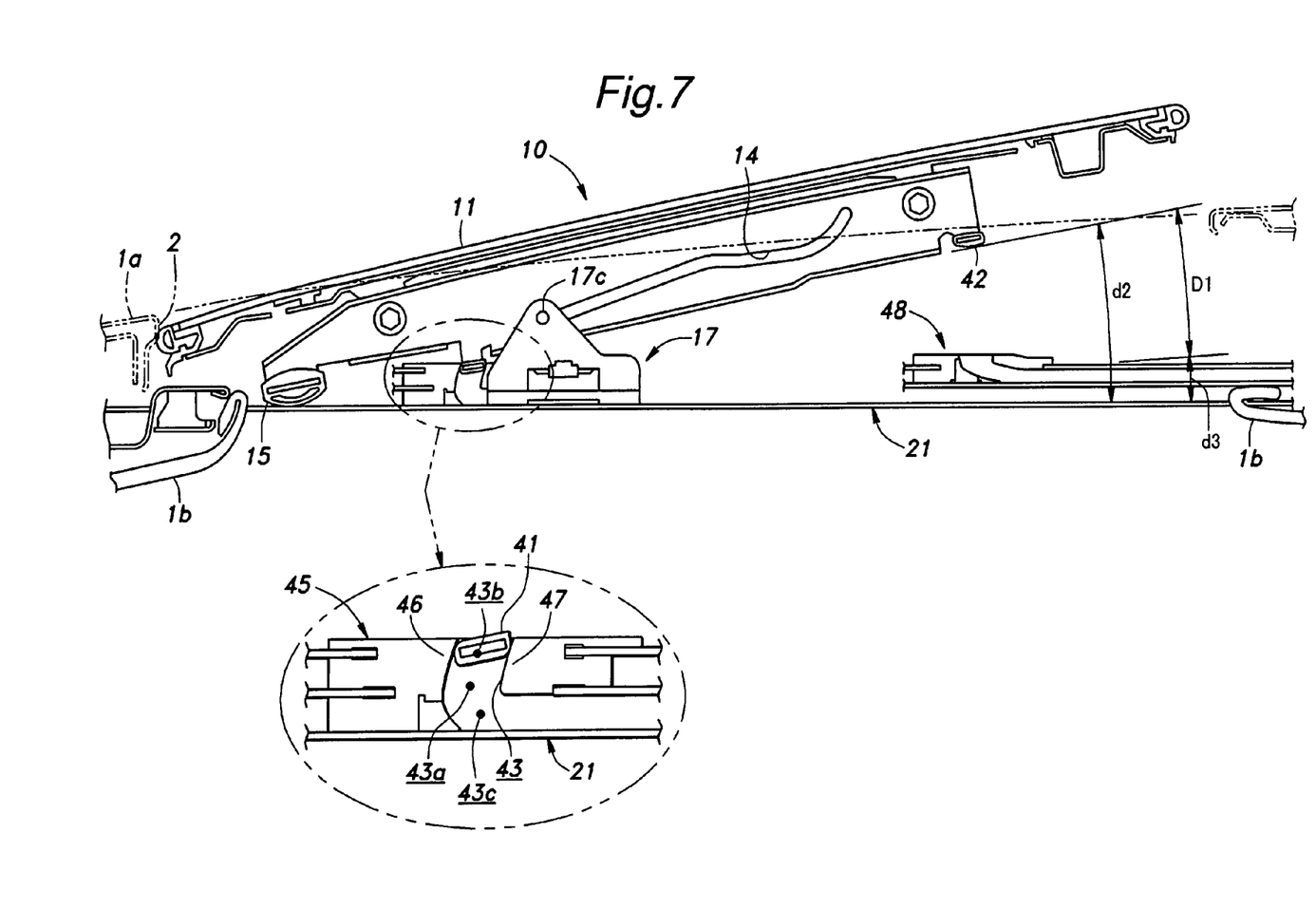
FIG. 7 is a sectional view similar to FIG. 2 when the sun roof panel is in the fully tilted up condition.
Figure 8:
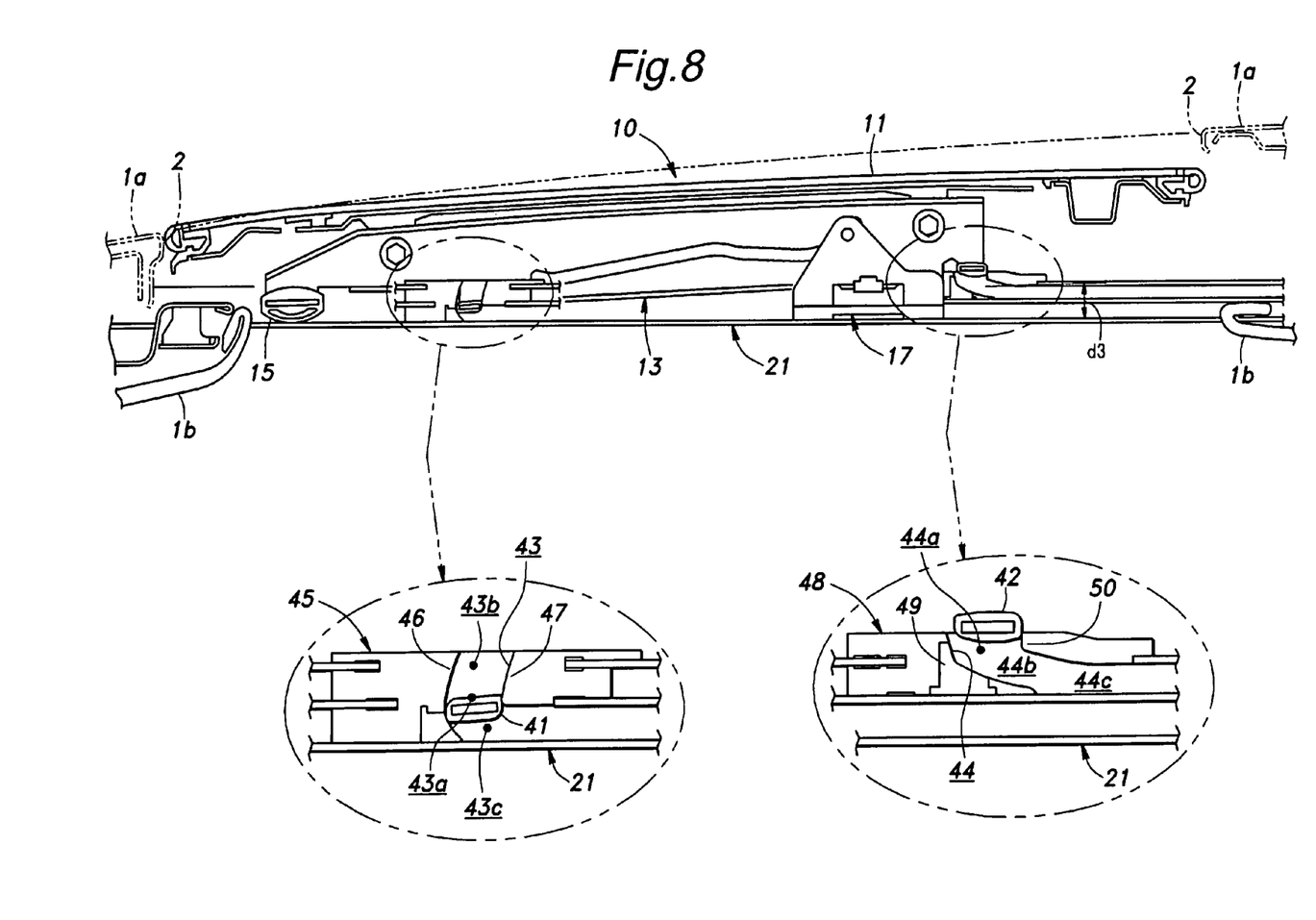
FIG. 8 is a sectional view similar to FIG. 2 when the sun roof panel is lowered from the fully closed position.
Figure 9:
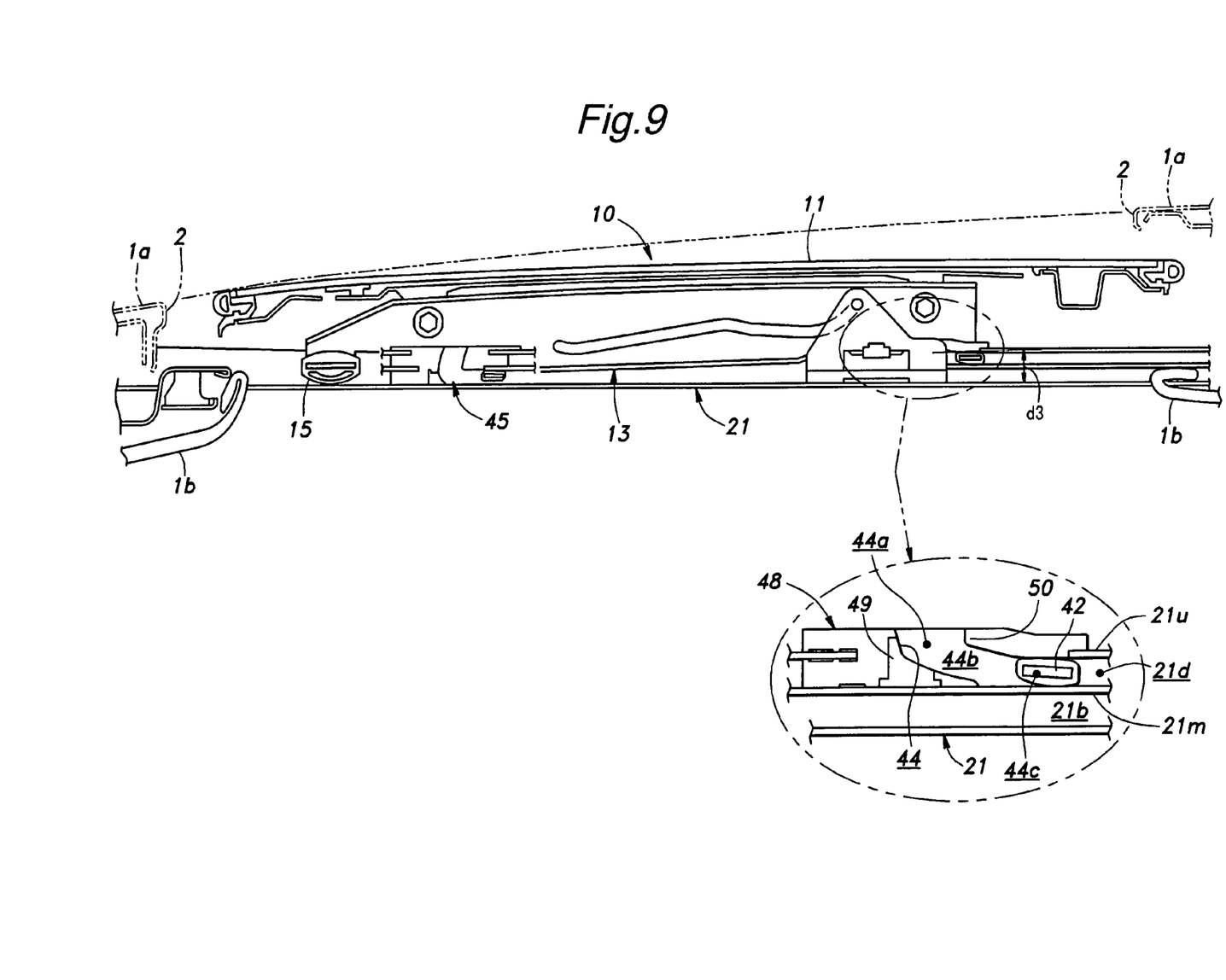
FIG. 9 is a sectional view similar to FIG. 2 when the sun roof panel has started to be moved rearward from the lowered position.

The mode of operation of the sun roof panel system is described in the following with reference to FIGS. 7 to 9. FIG. 7 is a sectional view similar to FIG. 2 when the sun roof panel is in the fully tilted up condition, FIG. 8 is a sectional view similar to FIG. 2 when the sun roof panel is lowered from the fully closed position; FIG. 9 is a sectional view similar to FIG. 2 when the sun roof panel has started to be moved rearward from the lowered position.

Referring to FIG. 7, when the rear slider 17 is pushed forward by being actuated by the drive motor 31, owing to the oblique configuration of the guide slot 14, the panel bracket 13 is tilted upward around the front end of the front slider 15. Once the pin 17c of the rear slider 17 has reached the front end of the guide slot 14, the sun roof panel 11 reaches the fully tilted up position, and the sun roof panel 11 or the panel bracket 13 forms an angle d2 with respect to the guide rail 21.

During the tilt up movement of the sun roof panel 11, the front cam piece 41 moves upward in the front cam groove 43. As the front cam piece 41 moves on from the vertical section 43a to the upper slanted section 43b during this process, the pivot center of the panel bracket 13 moves slightly rearward. Thereby, the weather strip 12 on the front edge of the sun roof panel 11 engaging the front edge of the opening 2 is prevented from stress and friction that could cause damages and deterioration of the weather strip. Meanwhile, the rear cam piece 42 is allowed to move freely upward. When the sun roof panel 11 tilts down to the fully closed position, the panel bracket 13 reverses the above described process.

Figure 10:
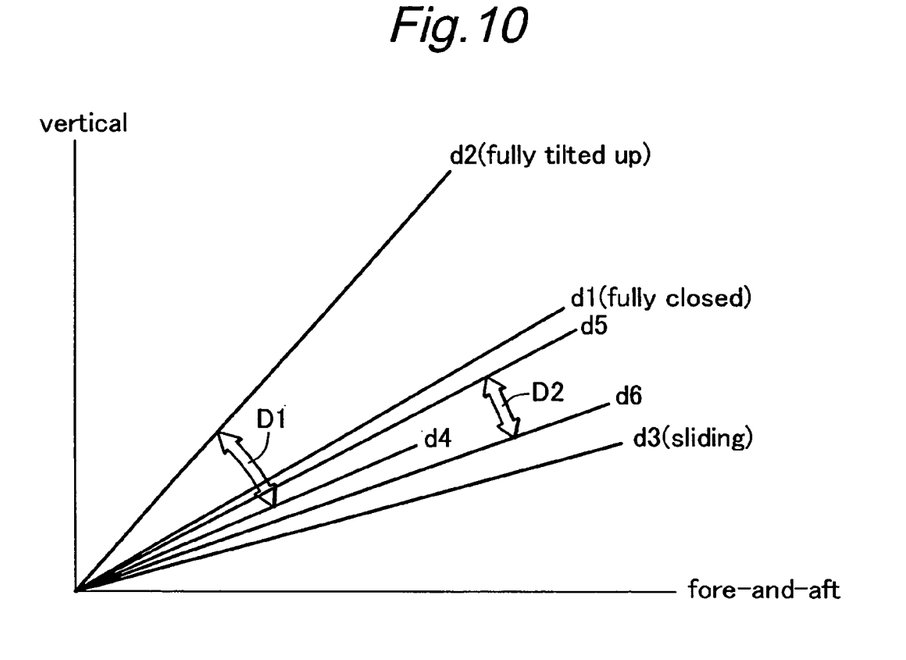
FIG. 10 is a diagram showing the relationships of the engaged states of the front and rear cam pieces with the angle of the sun roof panel.

The process of opening the sun roof panel 11 is described in the following. Reference should be made to FIG. 10 for the relationships of various angles of the sun roof panel 11. When the rear slider 17 is pulled rearward from the neutral position corresponding to the fully closed position by the drive motor 31, owing to the curved configuration of the guide slot 14, the panel bracket 13 tilts downward from the state illustrated in FIG. 2 (fully closed position) around the front end of the front slider 15. This causes the rear cam piece 42 to engage the vertical section 44a of the rear cam groove 44 as illustrated in FIG. 8. At this time, the panel bracket 13 forms an angle d5 with respect to the guide rail 21, and the front cam piece 41 maintains the engagement with the front cam groove 43. The angle d5 is slightly smaller than the angle d1 in the illustrated embodiment, but it is also possible that the angle d5 is slightly greater than the angle d1 or, in other words, the rear cam piece 42 is engaged against the fore-and-aft movement as well as the front cam piece 41 when the sun roof panel 11 is at the fully closed position.

As the rear slider 17 is moved further rearward, the front cam piece 41 is guided further downward in the front guide groove 43, and eventually reaches a point intermediate between the vertical section 43a and lower slanted section 43c of the front cam groove 43 or where the front cam piece 41 is disengaged from the rear wall 47. The angle of the panel bracket 13 at this point is d4 which is slightly greater than the angle d3. At the same time, the rear cam piece 42 is guided further downward in the rear guide groove 44, and eventually reaches a point immediately before the curved section 44b of the rear cam groove 44 or where the restriction of the rearward movement of the front cam piece 41 is removed. The angle of the panel bracket 13 at this point is d6 which is slightly greater than the angle d3. In the illustrated embodiment, the angle d4 is somewhat greater than the angle d6, but the angle d6 may also be equal to or greater than the angle d4. In other words, as illustrated in FIG. 10, the front cam piece 41 is engaged against a rearward movement by the front cam groove 43 at least over a first angular range D1 extending from the second angle d2 to the fourth angle d4. Similarly, the rear cam piece 42 is engaged by the rear cam groove 44 against a fore-and-aft movement over a second angular range D2 extending from the fifth angle d5 greater than the fourth angle to the sixth angle d6.

Therefore, the sun roof panel is engaged against the fore-and-aft movement both by the first cam piece and second cam piece over the angular range extending from the fifth angle d5 to the fourth angle d4 or the angular range where the first and second angular ranges (D1 and D2) overlap with each other.

Immediately before the rear cam piece 42 moves on to the curved section 44b of the rear cam groove 44 in the downward movement thereof, the front cam piece 41 moves to a position lower than that illustrated in FIG. 8, and reaches a point intermediate between the vertical section 43a and lower slanted section 43c of the front cam groove 43 or where the front cam piece 41 is disengaged from the rear wall 47. At this time point, the sun roof panel 11 has not started a rearward movement, and the pin 17c of the rear slider 17 has not reached the rear end of the guide slot 14. Meanwhile, the front wall 46 extends further downward than the rear wall 47 so that the forward movement of the panel bracket 13 is restricted even when the tilt angle of the panel bracket is smaller than d4.

As the rear slider 17 is pulled even further rearward by the drive motor 31, the rear cam piece 42 moves rearward and downward along the curved section 44b of the rear cam groove 44, and reaches the horizontal section 44c of the rear cam groove 44 as illustrated in FIG. 9 or the downward tilting movement of the sun roof panel 11 is completed. During the time when the rear cam piece 42 is guided by the curved section 44b, the panel bracket 13 moves on from the tilting down movement to a rearward sliding movement. At the same time as the rear cam piece 42 moves on to the horizontal section 44c of the rear cam groove 44, the pin 17c of the rear slider 17 reaches the rear end of the guide slot 14. At this time point, the panel bracket 13 forms an angle d3 with respect to the guide rail 21, and the sun roof panel 11 has moved rearward with respect to the opening 2 of the roof 1 by a distance corresponding to the horizontal component of the curved section 44b. In this process, upon reaching the lower slanted section 43c, the front cam piece 41 is disengaged from the front cam groove 43, and starts moving rearward along a substantially horizontal path.

As the rear slider 17 is actuated rearward even further, the front cam piece 41 and rear cam piece 42 are rearwardly guided in the lower and upper inner guide grooves 21b and 21d, respectively, until the fully open condition is reached where the front edge of the sun roof panel 11 passes or comes near the rear edge of the opening 2. As the two cam pieces 41 and 42 are guided by the separate guide grooves, the lower inner guide groove 21b is free from any break or cutout in the upper or lower wall thereof over the entire travel path of the front cam piece 41, and the front cam piece 41 can be guided smoothly even when the sun roof panel 11 is subjected to vertical accelerations owing to road surface irregularities and other causes as the sun roof panel 1 is actuated. When the sun roof panel 11 is actuated from the fully open position to the fully closed position, the aforementioned process is reversed.

In the illustrated embodiment, the angle d4 was somewhat greater than the angle d6, but the angle d6 may also be equal to or greater than the angle d4.

Therefore, when the sun roof panel 11 at the fully tilted up position, at the fully closed position or at any point between them, the front cam piece 41 is engaged by the front cam groove 43. During the time the sun roof panel 11 tilts from the fully closed position, the front cam piece 41 and rear cam piece 42 are both engaged by the front and rear cam grooves 43 and 44, respectively, so that the sun roof panel 11 is restricted from the fore-and-aft movement except for the time when the sun roof panel 11 is moving rearward. Therefore, without regard to the angular position of the sun roof panel 11 during the tilting up movement and tilting down movement, the sun roof panel 11 is protected from rattling or producing noises. Even when the vehicle is subjected to an impact such as the one caused by a frontal crash or rear end crash, the sun roof panel 11 is prevented from moving in the fore-and-aft direction.

Because the upper and lower inner guide grooves 21d and 21b for guiding the rear and front cam pieces 41 and 42 are provided opposite to the outer slider guide groove 21a for the front slider 15 and rear slider 17, the overall structure can be simplified, and the assembly process can be simplified.

Because the rear slider 17 is guided by both the outer slider guide groove 21a and the lower inner guide groove 21b via the two rear slider shoes 17d and 17e, respectively, the panel bracket 13 can be supported in a stable manner. Also, because the lower inner guide groove 21b is used for guiding the cable slider 17f, the front cam piece 41 and one of the rear slider shoes 17e, the guiding arrangement for the rear slider shoe 17d, 17e and cable slider 17f is simplified, and this contributes to a compact design of the guide rail 21.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent applications on which the Paris Convention priority claim is made for the present application as well as the contents of any prior art discussed in the disclosure are incorporated in this application by reference.

The invention claimed is:

1. A sun roof system for selectively opening an opening of a vehicle roof with a sun roof panel, comprising:
    a pair of guide rails extending along either lateral side of the opening of the vehicle roof;
    a pair of panel brackets integrally attached to either lateral side of the sun roof panel, each panel bracket including a front cam piece provided at a front part thereof, a rear cam piece provided at some distance behind the front cam piece and a guide slot extending a prescribed distance in a fore-and-aft direction and given with a prescribed profile;
    a front slider provided at a front end of each panel bracket for slidably supporting a front end of the panel bracket on the corresponding guide rail;
    a rear slider provided slidably supported by each guide rail behind the corresponding front slider, the rear slider being provided with a pin that engages the guide slot; and
    an actuator for actuating each rear slider in the fore-and-aft direction;
    the profile of the guide slot being configured such that a forward movement of the pin along the guide slot from a neutral point causes a vertical upward tilting of the sun roof panel around the front slider, a rearward movement along the guide slot from the neutral point causes a vertical downward tilting of the sun roof panel around the front slider as the pin travels, and a further rearward movement of the pin along the guide slot causes a rearward sliding movement of the sun roof panel;
    wherein the guide rail is provided with a front main cam groove and a rear main cam groove for guiding the front cam piece and rear cam piece in the fore-and-aft direction, a front vertical cam groove for vertically guiding the front cam piece into and out of the front main cam groove and a rear vertical cam groove for vertically guiding the rear cam piece into and out of the rear main cam groove, and
    wherein the sun roof panel is at a first angle (d1) with respect to the guide rail when the sun roof panel is at a fully closed position, at a second angle (d2) when the sun roof panel is at a fully tilted up position, and at a third angle (d3) when the sun roof panel is fully tilted down for the rearward sliding movement, and the front cam piece is engaged against a rearward movement by the front vertical cam groove at least over a first angular range (D1) extending from the second angle to a fourth angle (d4) slightly greater than the third angle,
        the rear cam piece being engaged by the rear vertical cam groove against a fore-and-aft movement over a second angular range (D2) extending from a fifth angle (d5) greater than the fourth angle to a sixth angle (d6) slightly greater than the third angle.

2. The sun roof system according to claim 1, wherein the rear vertical cam groove comprises an upper vertical section and a lower slanted section that smoothly connects the upper vertical section to the rear main cam groove.

3. The sun roof system according to claim 1, wherein the front vertical cam groove is defined by a front wall and a rear wall, and at least one of the front wall and rear wall engages the front cam piece with a vertically extending surface when the sun roof panel is at the first angle with respect to the guide rail.

4. The sun roof system according to claim 1, wherein the front vertical cam groove comprises a vertical middle section, a rearwardly slanted upper section that causes a slight rearward movement to the sun roof panel when tilting up the sun roof panel and a rearwardly slanted lower section that smoothly connects the vertical middle section to the front main cam groove.

5. A sun roof system, for selectively opening an opening of a vehicle roof with a sun roof panel, comprising:
- a pair of guide rails extending along either lateral side of the opening of the vehicle roof;
- a pair of panel brackets integrally attached to either lateral side of the sun roof panel, each panel bracket including a front cam piece provided at a front part thereof, a rear cam piece provided at some distance behind the front cam piece and a guide slot extending a prescribed distance in a fore-and-aft direction and given with a prescribed profile;
- a front slider provided at a front end of each panel bracket for slidably supporting a front end of the panel bracket on the corresponding guide rail;
- a rear slider provided slidably supported by each guide rail behind the corresponding front slider, the rear slider being provided with a pin that engages the guide slot; and
- an actuator for actuating each rear slider in the fore-and-aft direction;
- the profile of the guide slot being configured such that a forward movement of the pin along the guide slot from a neutral point causes a vertical upward tilting of the sun roof panel around the front slider, a rearward movement along the guide slot from the neutral point causes a vertical downward tilting of the sun roof panel around the front slider as the pin travels, and a further rearward movement of the pin along the guide slot causes a rearward sliding movement of the sun roof panel;
- wherein the guide rail is provided with a lower main cam groove and an upper main cam groove that are separated from each other by a horizontal wall for guiding the front cam piece and rear cam piece in the fore-and-aft direction, a front vertical cam groove for vertically guiding the front cam piece into and out of the lower main cam groove and a rear vertical cam groove for vertically guiding the rear cam piece into and out of the upper main cam groove;
- wherein the guide rail comprises a pair of upright walls extending in the fore-and-aft direction, and the upper main cam groove and lower main cam groove are formed on a side of one of the upright walls facing the other, a side of the other upright wall facing the one upright wall being provided with a slider guide groove for guiding the front slider and rear slider; and
- wherein the rear slider is further provided with a cable slider that engages a cable for actuating the rear slider, the cable slider being guided by a part of at least one of the upper and lower main cam grooves.

* * * * *